July 21, 1931.    R. S. HOYT    1,815,256
SERIES TYPE IMPEDANCE EQUALIZER FOR ANY SMOOTH LINE
Filed Nov. 20, 1929    2 Sheets-Sheet 1
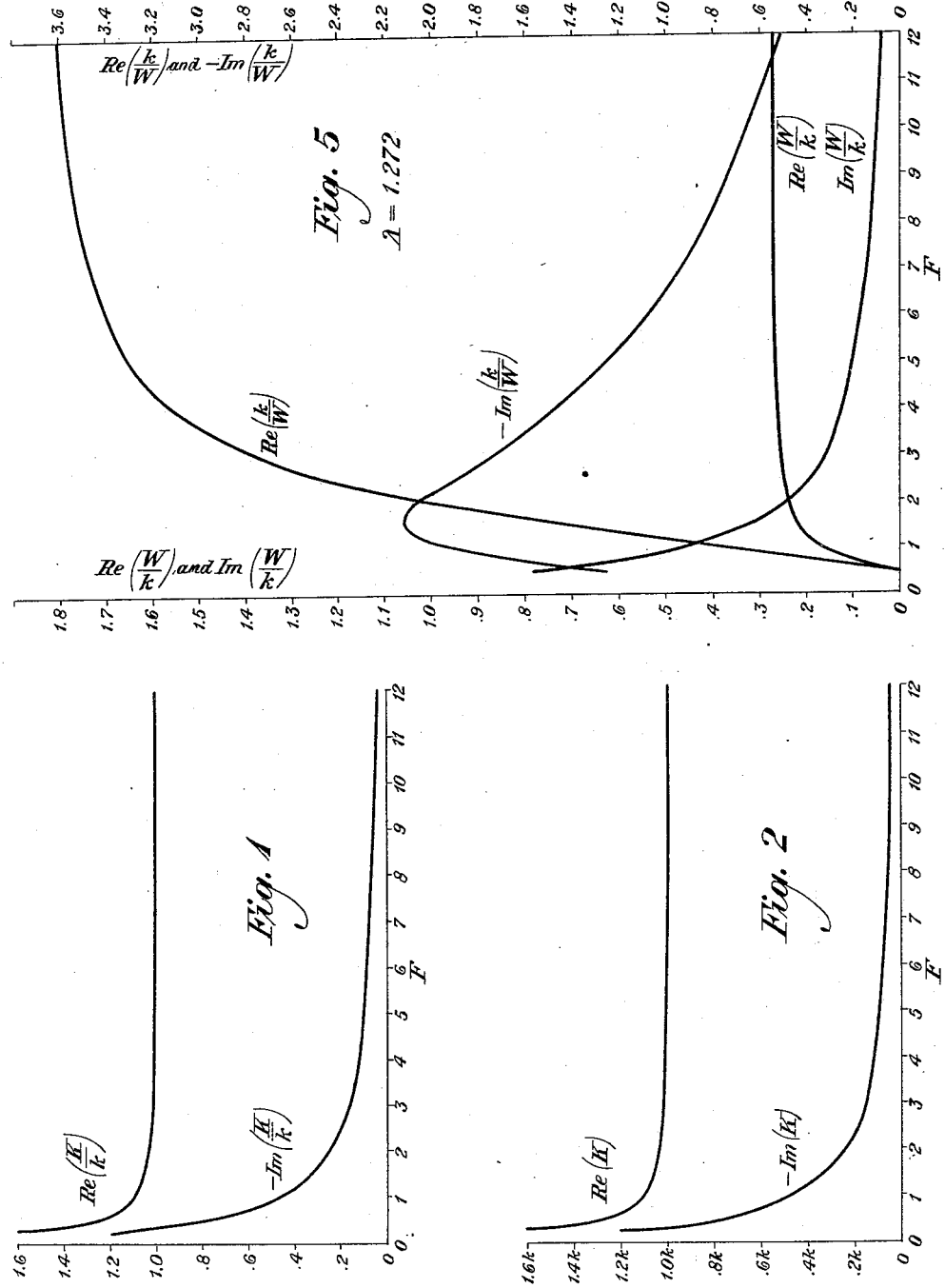
INVENTOR
R. S. Hoyt
BY
ATTORNEY July 21, 1931.   R. S. HOYT   1,815,256
SERIES TYPE IMPEDANCE EQUALIZER FOR ANY SMOOTH LINE
Filed Nov. 20, 1929   2 Sheets-Sheet 2
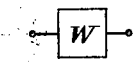
*Fig. 3*
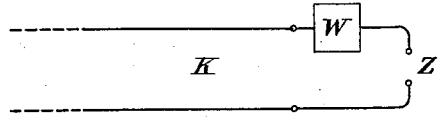
*Fig. 4*
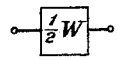
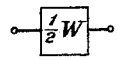
*Fig. 3a*
*Fig. 4a*
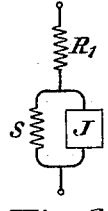 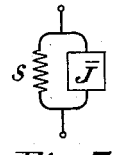 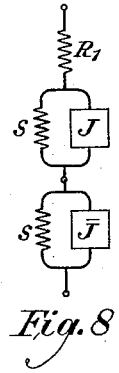 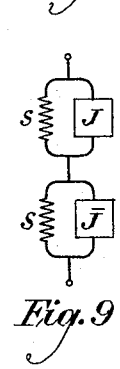 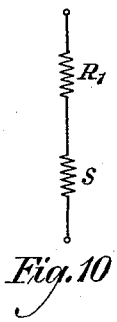 
*Fig. 6*  *Fig. 7*  *Fig. 8*  *Fig. 9*  *Fig. 10*  *Fig. 11*
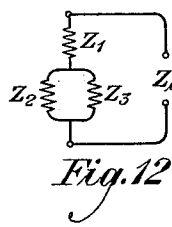 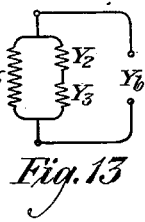 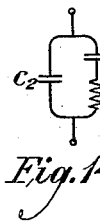 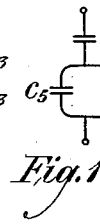 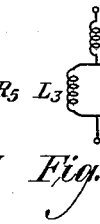 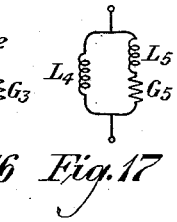
*Fig. 12*  *Fig. 13*  *Fig. 14*  *Fig. 15*  *Fig. 16*  *Fig. 17*
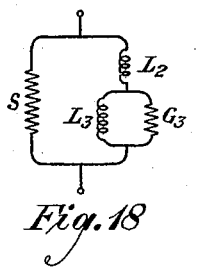 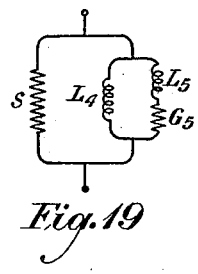 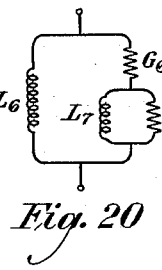 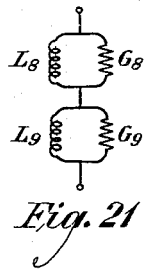 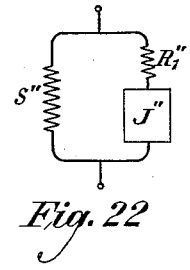
*Fig. 18*  *Fig. 19*  *Fig. 20*  *Fig. 21*  *Fig. 22*
INVENTOR
*R. S. Hoyt*
BY
ATTORNEY Patented July 21, 1931

1,815,256

UNITED STATES PATENT OFFICE

RAY S. HOYT, OF RIVER EDGE, NEW JERSEY, ASSIGNOR TO AMERICAN TELEPHONE AND TELEGRAPH COMPANY, A CORPORATION OF NEW YORK

SERIES TYPE IMPEDANCE EQUALIZER FOR ANY SMOOTH LINE

Application filed November 20, 1929. Serial No. 408,579.

It is well-known in communication engineering that the characteristic impedance (iterative impedance) of a smooth line varies considerably with frequency, over the voice frequency-range, particularly toward the lower end of this range, though at high frequencies the impedance approaches a constant resistance.

The term 'smooth line' here includes, as usual, any electrical transmission line whose fundamental parameters (resistance, inductance, leakance, capacitance) are sensibly uniformly distributed along the line; thus, among smooth lines are included non-loaded open-wire lines, non-loaded cables, and uniformly loaded cables (aerial, underground, and submarine). As here used, the term 'smooth line' will be understood to include also any line which is effectively smooth in the sense that, over the contemplated frequency-range, its characteristic impedance is approximately the same as though the line parameters were uniformly distributed along the line; thus, for instance, a periodically loaded line is effectively smooth over the frequency-range in which the distance between loads is small compared with the wave length.

For some purposes the existing rather large departure of the line impedance at the lower frequencies is undesirable, or even very harmful, so that it is desirable to have a compensating network to associate with the initial end of the line in order that the resulant impedance shall be approximately a mere resistance over a wide frequency-range; more particularly, so that this resistance shall be approximately equal to the value of the characteristic impedance at high frequencies. Such a network will here be termed an 'impedance-equalizer' or, briefly, an 'equalizer'.

The principal object of the present invention is to provide various precision forms of series-type impedance-equalizers, each for combination with any smooth line so that the resultant impedance shall be approximately equal to a mere constant resistance over a wide frequency-range, such as the voice frequency-range.

Some of the possible uses of 'impedance-equalizers' are as follows:

To enable the impedance of any smooth line, over a wide frequency-range, to be simulated or to be balanced by a mere constant resistance.

To enable two smooth lines, originally having unequal impedances, to balance each other when a 21-type repeater is worked between them (the equalized lines being rendered equal by the addition of a series resistance to the smaller or by a shunt resistance to the larger, or by the insertion of suitable transformers between the repeater and the equalized lines).

To make the 'power factor' of a smooth line, at its terminals, equal to unity over a wide frequency-range; that is, to eliminate the wattless component of the current entering the system.

To reduce the building-up time of the entering current, by reducing the transient distortion. (If the impedance of the system were a pure resistance at all frequencies, there would be no transient distortion, and hence the building-up time would be zero: thus the current would attain instantly its steady-state value.)

To reduce the discharging time of the system when the source of impressed electromotive force is replaced by an impedance; that is, to reduce the 'relaxation time' of the system. (This reduction can be understood from the fact that the removal of an electromotive force is equivalent to the insertion of its negative: the steady-state part of the current produced by this negative e. m. f. exactly annuls the current due to the original e. m. f.—this current being suposed to have attained its steady-state value—and the transient distortion part produced by the negative e. m. f. is reduced by the presence of the impedance-equalizer, in accordance with the paragraph just preceding.)

Before proceeding further with this specification, the attached figures will be summarized: Figs. 1 and 2 show generic graphs of the characteristic impedance of smooth lines, over a wide frequency-range (F being proportional to the frequency, $f$). Fig. 3 represents any 2-terminal network, having any impedance, denoted by W; and Fig. 4 shows this network combined in series relation with any smooth line, of characteristic impedance K; in particular, this network, of impedance W, may be any one of the series-type impedance-equalizers of my invention. Figs. 3a and 4a are the same as Figs. 3 and 4 respectively, except that the equalizer is constructed of two like parts, each of impedance W/2, for the sake of preserving the balance of the system to ground—a necessary requirement in most applications. Fig. 5 shows a generic graph of the requisite value of the equalizer-impedance W in order to attain perfect equalization of the line impedance K, when the line leakance is negligible; also a graph of the equalizer-admittance 1/W. Fig. 7 represents semi-generically the series-type impedance-equalizer of my invention; and Figs. 6, 8, 9, 10, 11, in connection with expository matter in the specification, serve to show that the equalizer of Fig. 7 is actually capable of equalizing the line impedance K with a high degree of precision over a wide frequency-range. Figs. 18, 19, 20, 21, represent four specific forms of 4-element series-type impedance-equalizers derivable from the semi-generic form of equalizer represented by Fig. 7; thus the equalizers represented by Figs. 18, 19, 20, 21 constitute specific forms of equalizers of my present invention. Figs. 12, 13, 14, 15, 16, 17, in connection with expository matter in the specification, serve to show how the four specific forms of equalizers represented by Figs. 18, 19, 20, 21 are derivable from the semi-generic form represented by Fig. 7. Fig. 22 represents a network equivalent to the network of Fig. 6; each is capable of simulating the line impedance K with high precision over a wide frequency-range; these two figures, 6 and 22, are introduced for expository purposes.

Before setting forth the theory, design-methods, and design-formulæ of this invention, it will be desirable to review briefly but in a precise manner the nature of the dependence of the characteristic impedance of a smooth line on the frequency. By the characteristic impedance of any transmission line is here meant, as usual, the line impedance when the line is so long that its impedance is sensibly independent of the distant terminating impedance.

The well-known general formula for the characteristic impedance K of any smooth line is $$K = \sqrt{(R+i\omega L)/(G+i\omega C)} \quad (1)$$

R, L, G, C, denoting the line-parameters per unit length, namely, the resistance inductance, leakance, capacity (capacitance); and $\omega$ denoting $2\pi$ times the frequency $f$; and $$i = \sqrt{-1}.$$

The foregoing Formula (1) for K has been very thoroughly studied in my paper "Impedance of smooth lines and design of simulating networks" published in the Bell System Technical Journal of April, 1923; also in my U. S. Patent 1,713,603, issued May 21, 1929. As there stated, the effects produced on the impedance K by normal values of the leakance G are slight except at very low frequencies (below the voice range). Hence, for the present expository discussion of the nature of the dependence of the impedance K on the frequency, the leakance may be neglected. This results in a great gain in simplicity of exposition; for, with G set equal to zero, Equation (1) can be written $$K = k\sqrt{1 - i/F} \quad (2)$$

where $$k = \sqrt{L/C} \quad (3)$$

and $$F = \omega L/R \quad (4)$$

Thus when the line-parameters (R, L, C) are independent of the frequency, $k$ is a mere constant and F is directly proportional to the frequency; $k$, called the nominal impedance, is the limiting value of K at very high frequency, as is seen from (2) by setting $$F = \infty$$

Usually the line-parameters (R, L, C) are very nearly independent of the frequency over at least the voice frequency-range.

Since Equation (2) can be written $$K/k = \sqrt{1 - i/F} \quad (5)$$

it is seen that the nature of the dependence of the characteristic impedance of all non-leaky smooth lines on the frequency can be represented by a single graph, namely a graph of $$\sqrt{1 - i/F}$$

as a function of F. In Fig. 1, which presents such a graph, the upper and lower curves depict respectively the real (R$e$) part and the negative of the imaginary (I$_m$) part of $K/k = \sqrt{1-i/F}$.

Hence, in any specific case, these curves, after their ordinates are multiplied by the specific value of $k$, depict respectively the resistance component and the negative of the reactance component of K, as functions of F, as in Fig. 2. The considerable departure of K from its limiting value $k$, particularly at the lower values of F, is clearly and simply shown by Fig. 2.

As a generic basis for demonstrating the impedance-equalizing properties possessed by the impedance-equalizers disclosed later herein, and also as a generic basis for deriving general design-formulæ for use in any specific case, the formula for the resultant impedance Z of the system represented by Fig. 4 will next be studied. The formula for Z, is of course, $$Z = W + K \quad (6)$$

Hence, if the desired or prescribed value for Z is denoted by B, then the precision of equalization attained will evidently be shown by a graph of the ratio Z/B as function of F; and also by a graph of the fractional departure $$|(Z-B)/B|$$

where the two vertical bars enclosing an expression denote that the absolute value of the expression is to be taken. From (6), and the equation $$\lambda = B/k \quad (7)$$

defining $\lambda$, we get $$\frac{Z}{B} = \frac{1}{\lambda}\left(\frac{W}{k} + \frac{K}{k}\right) \quad (8)$$

from which $(Z-B)/B$ is obtainable by merely subtracting unity, since $$\frac{Z-B}{B} = \frac{Z}{B} - 1 \quad (9)$$

In order that the equalization shall be exact, Z/B must be equal to unity, whence the requisite value of W/B for producing exact equalization is $$W/B = 1 - K/\lambda k \quad (10)$$

which thus constitutes the general design-formula for expressing the requisite value of W/B in terms of K/k and $\lambda$, as function of F.

In particular, when the line leakance G is negligible, so that K/k has the value expressed by Equation (5), then the requisite value of W/B is $$\frac{W}{B} = 1 - \frac{\sqrt{1-i/F}}{\lambda} \quad (11)$$

whence $$W/k = \lambda - \sqrt{1-i/F} \quad (12)$$

For the particular case here contemplated, these Equations, (11) and (12), constitute exact design-formulæ. Fig. 5 gives a graph of W/k computed from (12) with $\lambda = 1.272$, which (assuming B equal to the real part of K at F=0.5 as shown by the upper graph of Fig. 2) is the requisite value of $\lambda$ for rendering equalization physically possible down to as low a value of F as F=0.5; Fig. 5 gives also a graph of the reciprocal of W/k.

If it were possible to devise a network whose impedance W would vary with F in exact accordance with Equation (10), that network, when associated with the line as in Fig. 4, would make the resultant impedance Z exactly equal to B at all frequencies. This result can be closely attained by means of the equalizing networks constituting my present invention, as will appear in the course of this specification.

In order to impart a clear understanding of the nature and proportioning of the various equalizing networks of my present invention, I will now outline the steps by which I arrived at them.

Stated very briefly, I imagined the line to be replaced by a semi-generic network known to be capable of simulating the line impedance very closely, then I devised a semi-generic impedance-equalizer exactly equalizing the impedance of this network, and finally I devised various specific forms of this impedance-equalizer. These several steps will next be described more fully.

Fig. 6 represents the semi-generic simulating network by which I imagined the line to be replaced. That this network is capable of simulating the line impedance K over a wide frequency-range with a high degree of precision is known from my above-cited article published in the Bell System Technical Journal of April 1923, and also from my U. S. Patent 1,713,603, issued May 21, 1929. For Fig. 6 is the same as Fig. 13$a$ of that article and as Fig. 13$a$ of that patent, except for a simplification of the notation, in that S, R$_1$, J of Fig. 6 stand for S′, R$_1$′, J′ of the above-cited references; thus all of the letters in Figs. 6, 7, 8, 9, 10, 11, 14, 15, 16, 17, 18, 19, 20, 21 of the present patent specification are to be regarded, in imagination, as affected with a single prime, or single accent (′), which is actually omitted, merely for simplicity.

I here call the network of Fig. 6, a 'semi-generic' network because part of it, namely the J-part, is represented generically rather than specifically; the J-part may take at least two specific forms, as shown later herein. The J-part will be called an 'excess-simulator', as in my above-cited paper and patent; its impedance is denoted by J; $R_1$ and S designate pure resistance elements, and also denote their values (ohms). Thus, in Fig. 6, the letters J, $R_1$, S play two distinct roles: they 'designate' the parts of the network, and they 'denote' the algebraic values (complex, in general) of the impedances of those parts: this double usage, which has the advantage of brevity, will hardly lead to confusion. The same sort of usage will be employed in connection with all of the other network figures of this specification, except that in specific networks containing capacities and inductances those specific parts will be designated and denoted by capacity symbols and inductance symbols respectively.

On referring to my above-cited article and patent it will be found that the $R_1$, J, S parts of the simulating network in Fig. 6 of the present patent application have the following physical significance and functions: $R_1$ is a pure resistance element (called the 'basic resistance') chosen equal to the 'nominal impedance'

$$k = \sqrt{L/C}$$

of the given line; thus $R_1$ alone is capable of closely simulating the line impedance over the high frequency-range. Now, at all frequencies the line impedance K exceeds the nominal impedance $k$ by an amount $K-k$, called the 'excess impedance', which, tho sensibly zero at high frequencies, is quite large in the lower part of the voice frequency-range, as indicated by Fig. 2. The 'excess impedance' of the line is closely simulated by the impedance J in Fig. 6, except at extremely low frequencies. The S-part, shunting the J-part, is a pure resistance, serving by its modifying shunting action to improve the effect of the J-part, particularly at extremely low frequencies. The J-part alone is termed an 'excess simulator' because it alone usually suffices for simulating the 'excess impedance' of the line; the J-part and S-part together are called a 'modified excess-simulator'.

Fig. 7 represents a semi-generic form of the impedance-equalizers of my invention; the $\overline{J}$-part may take various specific forms (corresponding to the various specific forms of J), as disclosed somewhat later herein.

Fig. 8 represents the network of Fig. 7 combined in series with the network of Fig. 6—which, it will be recalled, simulates the line impedance (with a high degree of precision).

Fig. 9 represents the network of Fig. 8 with $R_1$ removed, for purposes of exposition. Thus the network of Fig. 9 consists of the series combination of two compound parts, one being the parallel combination of S and J, the other the parallel combination of S and $\overline{J}$. If the impedance of the network of Fig. 9 is denoted by X, then $$X = \frac{SJ}{S+J} + \frac{S\overline{J}}{S+\overline{J}} \quad (13)$$

This equation can be written in the form $$\frac{X}{S} = \frac{2J\overline{J} + S(J+\overline{J})}{J\overline{J} + S^2 + S(J+\overline{J})} \quad (14)$$

which yields the important conclusion that $$X = S \quad (15)$$

if $$J\overline{J} = S^2 \quad (16)$$

that is, if $$\overline{J} = S^2/J \quad (17)$$

Therefore I design the $\overline{J}$ part of the network of Fig. 7 in accordance with Equation (17), so that the impedance X of the network of Fig. 9 reduces to the mere resistance value S; whence the network of Fig. 8 reduces to the simple network of Fig. 10, consisting merely of the resistance $R_1$ in series with a resistance equal to S; and the network of Fig. 10 is, of course, equivalent to the single resistance $R_o$, represented by Fig. 11, having the value $$R_o = R_1 + S \quad (18)$$

Thus, by consideration of Figs. 6, 8, 9, 10, 11, it has been shown that the network of Fig. 7, when connected in series with a smooth line of impedance K, will render the resultant impedance Z closely equal to the resistance $R_o$ of Equation (18), provided merely that the $\overline{J}$-part is proportioned in accordance with Equation (17), which is therefore the design-formula for $\overline{J}$.

The $\overline{J}$-impedance, when proportioned in accordance with Equation (17), will be termed the "inverse' of the J-impedance with respect to the resistance S, which will be termed the 'resistance of inversion'. Or, stated symmetrically, the J-impedance and the $\overline{J}$-impedance will be termed the 'inverses' of each with respect to the resistance S, the 'resistance of inversion'.

In order readily to derive specific forms of the $\overline{J}$-part corresponding to known specific forms of the J-part, it is desirable to know the general relations which must exist between any two networks in order that their impedances shall be the 'inverses' of each other with respect to a specified resistance. For this purpose consider any two networks, designated as $a$ and $b$, each consisting of $m$ elements. Let $Z_1, Z_2, \ldots Z_m$ denote the impedances of the elements of the $a$-network; and $Y_1, Y_2, \ldots, Y_m$ the admittances of the elements of the $b$-network. Finally, let $Z_a$ denote the impedance of the $a$-network, and $Y_b$ the admittance of the $b$-network. Then $$Z_a = F_a(Z_1, Z_2, \ldots, Z_m) \quad (19)$$
$$Y_b = F_b(Y_1, Y_2, \ldots, Y_m) \quad (20)$$

where $F_a$ and $F_b$ are functional symbols, in the usual sense. Now if these two functions are of the same mathematical form, as indicated by the functional equation $F_a = F_b = F$, so that $$Z_a = F(Z_1, Z_2, \ldots, Z_m) \quad (21)$$
$$Y_b = F(Y_1, Y_2, \ldots, Y_m) \quad (22)$$

or, in words, if the admittance $Y_b$ of the $b$-network is the same function of its admittance elements $Y_1, Y_2, \ldots Y_m$ as the impedance $Z_a$ of the $a$-network is of its impedance elements $Z_1, Z_2, \ldots, Z_m$, then the networks $a$ and $b$ will be said to be 'inverse in form' or 'formally inverse'. Further, if the ratio of each impedance element $Z_j$ of the $a$-network to the corresponding admittance element $Y_j$ of the $b$-network has any value $A^2$ which is the same for all of the elements, in accordance with the equation $$Z_j Y_j = A^2 \text{ (with } j=1, 2, \ldots, m) \quad (23)$$

where $A$ evidently has the dimensions of an impedance, then the two networks, $a$ and $b$, will be the 'inverses' of each other with respect to the impedance $A$; for, with relation (23) fulfilled, it is seen that $$Z_a/Y_b = A^2 \quad (24)$$

or $$Z_a Z_b = A^2 \quad (25)$$

$Z_b$ denoting the impedance of the $b$-network. From (23) it is seen that $A$, the 'impedance of inversion', has the value $$A = \sqrt{Z_j/Y_j} \quad (26)$$

In the remainder of the present patent specification, $A$ will be a mere resistance.

The foregoing general definitions and theory pertaining to the subject of 'inverse' networks will now be illustrated somewhat concretely by application to the somewhat concrete networks represented by Figs. 12 and 13. Owing to their respective forms, it is convenient to regard Fig. 12 as being an $a$-network and Fig. 13 as being a $b$-network. The equations for the impedance $Z_a$ and the admittance $Y_b$ of these two networks being respectively, $$Z_a = Z_1 + \frac{Z_2 Z_3}{Z_2 + Z_3} = F(Z_1, Z_2, Z_3) \quad (27)$$

$$Y_b = Y_1 + \frac{Y_2 Y_3}{Y_2 + Y_3} = F(Y_1, Y_2, Y_3) \quad (28)$$

show that these two networks are 'inverse in form'. Also, these two equations show that these two networks will, further, be 'inverse' with respect to any resistance $A$ if $$Z_1/Y_1 = Z_2/Y_2 = Z_3/Y_3 = A^2 \quad (29)$$

for then $$Z_a Z_b = Z_a/Y_b = A^2 \quad (30)$$

In order to arrive at specific forms of the $\overline{J}$-part of the impedance-equalizer represented by Fig. 7, it remains to show specific forms of the $J$-element of Fig. 6. Two precision forms of the $J$-element are represented by Figs. 14 and 15, which are of the same form as Figs. 7a and 7b of my above-cited article and patent. Fig. 16 represents a network which is 'potentially inverse' to the network of Fig. 14 in the sense that the network of Fig. 16 is of such nature that it admits of being so proportioned as to be 'inverse' to the network of Fig. 14. Similarly the network of Fig. 17 is 'potentially inverse' to the network of Fig. 15. The resistance-elements in Figs. 16 and 17 are specified by their conductance values, $G_3$ and $G_5$, in order to preserve the natural symmetry of the 'inverse' relations; similarly in Figs. 18, 19, 20, 21. The L's denote inductances.

Figs. 18, 19, 20, 21 represent four specific forms of impedance-equalizers, obtained as follows: The equalizer in Fig. 18 is obtained from the semi-generic equalizer in Fig. 7 by substituting for the generic $\overline{J}$-part of Fig. 7 the specific network of Fig. 16. Similarly Fig. 19 is obtained from Fig. 7 by substituting the network of Fig. 17 for the $\overline{J}$-part of Fig. 7. The equalizers represented by Figs. 20 and 21 are derivable from that of Fig. 19 by applying 'transformation B' and 'transformation E' respectively, given in Appendix III of O. J. Zobel's article entitled 'Theory and design of uniform and composite electric wave-filters' published in the Bell System Technical Journal of January, 1923; and, incidentally, those same transformations serve also for verifying that the four equalizers of Figs. 18, 19, 20, 21 are actually 'potentially equivalent' to each other, in the sense that, when the elements of any one of them are assigned in value, the three other networks admit of being so proportional as to have at all frequencies the same impedances as the assigned network.

Although the four equalizers of Figs. 18, 19, 20, 21 are potentially equivalent to each other as regards impedance, they may, of course, differ somewhat as regards such features as facility of manufacture, cost, and space occupied.

The fact that the equalizer in Fig. 21 consists of two series parts which are of like nature, each consisting of a resistance-inductance parallel combination, suggests the possibility of attaining still higher precision of equalization by constructing the equalizer of more than two such series parts. The suggestion receives further strength from the fact that a single such resistance-inductance part constitutes a simple form of impedance-equalizer possessing equalizing properties which are tolerably good though not so good as those of Fig. 21; this fact can be seen by applying the general equalizer-theory set forth in the present patent specification to the known simple form of simulating network consisting merely of a resistance in series with a resistance-capacity parallel combination, as represented by Fig. 12$b$ of my above-cited article and patent specification; thus, the equalizer in Fig. 21 is of the same form as though obtained by connecting in series two equalizers of the above-mentioned simple form known to be considerably less precise than the equalizer in Fig. 21; particularly at the lower frequencies. Finally, since the equalizer in Fig. 21 is potentially equivalent to each of those in Figs. 20, 19, 18, the further inference may be drawn that an equalizer of the form obtained by connecting any two or more of these four equalizers in series would be potentially more precise than any one of them alone.

The requisite proportioning, or design, of the impedance-equalizers represented by Figs. 18, 19, 20, 21 will now be treated. Two methods will be presented: An 'indirect' method, and a 'direct' method.

The 'indirect' method proceeds along the same lines of thought as already employed for expository pupposes in the foregoing portion of this patent specification; that is, the 'indirect' method, after its first step, deals not with the given transmission line itself but with a simulating network whose impedance is known to be very closely equal to the impedance of the given line over a sufficiently wide frequency-range. Thus, the first step is to design the simulating network of Fig. 6 in terms of the fundamental parameters of the line; this can be accomplished, for instance, in the manner fully set forth in my above-cited article in the Bell System Technical Journal of April, 1923, and in my U. S. Patent 1,713,603; the J-part of Fig. 6 may take either of the equivalent specific forms represented by Figs. 14 and 15. The nature of the remaining steps in the 'indirect' method of design is clear from the foregoing portion of the present patent specification.

The 'direct' method of design starts with any chosen one of the equalizers of Figs. 18, 19, 20, 21, each of which is known, from the foregoing portion of this patent specification, to be of such form and kind as potentially to possess equalizing properties; then, by means of Equation (10), the 'direct' method imposes the requisite values of the equalizer impedance $W$ at any arbitrary (but reasonably chosen) frequencies sufficient in number to detemine the fundamental elements constituting the chosen form of equalizer. The 'direct' method will be illustrated by applying it to the design of the equalizer in Fig. 21, whose fundamental elements are the resistances $R_8=1/G_8$ and $R_9=1/G_9$, and the inductances $L_8$ and $L_9$. Since the number of these fundamental elements is 4, the number of frequencies at which the impedance $W=U+iV$ of the equalizer in Fig. 21 can take on preassigned values is one-half of 4, namely 2—because, at any one frequency, $W$ has two components (resistance $U$ and reactance $V$). The formula for $W=U+iV$ of the equalizer in Fig. 21 is, of course, $$W=\frac{R_8(i\omega L_8)}{R_8+i\omega L_8}+\frac{R_9(i\omega L_9)}{R_9+i\omega L_9} \quad (31)$$

which can be written $$U+iV=\frac{i\alpha\omega-\beta\omega^2}{1+i\rho\omega-\sigma\omega^2} \quad (32)$$

where $$\alpha=L_8+L_9 \quad (33)$$
$$\beta=(R_8+R_9)L_8L_9/R_8R_9 \quad (34)$$
$$\rho=\frac{L_8}{R_8}+\frac{L_9}{R_9} \quad (35)$$
$$\sigma=L_8L_9/R_8R_9 \quad (36)$$

On clearing Equation (32) of fractions and then equating real parts on the two sides, and likewise equating imaginary parts, we get the following pair of equations to be satisfied at any frequency:

$$\omega V\rho+\omega^2 U\sigma+O\alpha-\omega^2\beta=U \quad (37)$$
$$-\omega U\rho+\omega^2 V\sigma+\omega\alpha+O\beta=V \quad (38)$$

In Equations (37) and (38) the zero terms $O\alpha$ and $O\beta$ are supplied for formal completeness. For the pupposes of design, the quantities $U$ and $V$ are here to be regarded as the preassigned requisite values of the equalizer impedance for attaining exact equalization at any specified frequency $f=\omega/2\pi$, these values of $U$ and $V$ being precalculated by means of Equation (10). The parameters $\rho, \sigma, \alpha, \beta$ are to be regarded as unknown and to be evaluated. Since these parameters are four in number they cannot be completely evaluated from merely the two Equations (37) and (38), but evidently require altogether four equations. By preassigning at any two frequencies, $f_1$ and $f_2$, the requisite values of $U$ and $V$, we obtain from Equations (37) and (38) the following set of four independent simultaneous linear equations in the four unknown parameters $\rho, \sigma, \alpha, \beta$:

$$\omega_1 V_1\rho+\omega_1^2 U_1\sigma+O\alpha-\omega_1^2\beta=U_1 \quad (39)$$
$$\omega_2 V_2\rho+\omega_2^2 U_2\sigma+O\alpha-\omega_2^2\beta=U_2 \quad (40)$$
$$-\omega_1 U_1\rho+\omega_1^2 V_1\sigma+\omega_1\alpha+O\beta=V_1 \quad (41)$$
$$-\omega_2 U_2\rho+\omega_2^2 V_2\sigma+\omega_2\alpha+O\beta=V_2 \quad (42)$$

which, of course, suffice for determining $\rho, \sigma, \alpha, \beta$ in terms of the preassigned values of $\omega_1$, $U_1$, $V_1$, $\omega_2$, $U_2$, $V_2$, by the method of determinants or otherwise. Finally, with $\rho$, $\sigma$, $\alpha$, $\beta$ thus evaluated, the values of the fundamental elements $R_8$, $L_8$, $R_9$, $L_9$ constituting the equalizer of Fig. 21 can be found by solving the set of four independent simultaneous Equations (33), (34), (35), (36) for $R_8$, $L_8$, $R_9$, $L_9$ in terms of $\alpha$, $\beta$, $\rho$, $\sigma$.

It might perhaps be thought that equalizers of still other forms and kinds could be obtained by starting with the simulating network represented by Fig. 22 instead of with that represented by Fig. 6, the network of Fig. 22 being the same as the network of Fig. 13$b$ in my above-cited article in the Bell System Technical Journal of April, 1923 and of my U. S. Patent 1,713,603. However, as shown in connection with Equations (44), (45), (46) of the above-cited references, the network of Fig. 22 in the present patent specification is potentially equivalent to the network of Fig. 6; hence, when connected in series with the equalizer represented by Fig. 7, the network of Fig. 22 can lead to no series-type equalizers other than those obtainable by starting with the simulating network represented by Fig. 6.

It will be obvious that the general principles herein disclosed may be embodied in many other organizations widely different from those illustrated without departing from the spirit of the invention as defined in the following claims.

What is claimed is:

1. In a smooth line whose characteristic impedance includes reactance, and which may be substantially simulated by a network consisting of a resistance in series with a parallel combination comprising a second resistance in parallel with a compound impedance unit including both resistance and reactance, means to equalize the characteristic impedance of said smooth line over a wide frequency range so that the resultant impedance is substantially a pure resistance, said means comprising a network connected in series with said line, said network being electrically equivalent to a parallel combination of a resistance equal to said second resistance and a compound impedance unit which is the inverse with respect to said second resistance of said compound impedance unit of said first parallel combination.

2. In a smooth line whose characteristic impedance includes reactance, and which may be substantially simulated by a network consisting of a resistance in series with a parallel combination comprising a second resistance in parallel with a constituent network which is a definite function of the individual impedances of the component impedance elements, means to equalize the characteristic impedance of said smooth line over a wide frequency range so that the resultant impedance is substantially a pure resistance, said means comprising a network connected in series with said line, said network being electrically equivalent to a parallel combination of a resistance equal to said second resistance and a second constituent network which comprises a plurality of component admittance elements so related that the admittance of said second constituent network will be the same function of the individual component admittance elements as the function which relates the impedance of said first mentioned constituent network to the impedances of the individual elements thereof.

3. In a smooth line whose characteristic impedance includes reactance and which may be substantially simulated by a network consisting of a resistance of value $R_1$ in series with a parallel combination comprising a second resistance of value $S$ in parallel with a compound impedance unit whose value may be expressed by the symbol $J$ when $J$ includes both resistance and reactance components, means to equalize the characteristic impedance of said smooth line over a wide frequency range so that the resultant impedance is substantially a pure resistance, said means comprising a network connected in series with the line, said network being electrically equivalent to a parallel combination of a resistance of value $S$ in parallel with a compound impedance unit whose value may be expressed by the symbol $\bar{J}$, when $\bar{J}$ is equal to $S^2/J$.

4. In a smooth line whose characteristic impedance includes reactance, means to equalize the characteristic impedance of said smooth line over a wide frequency range so that the resultant impedance is substantially a pure resistance, said means comprising a network connected in series with the line, said network comprising a plurality of component units connected in series, each component unit comprising a resistance in parallel with an inductance.

5. In a smooth line whose characteristic impedance includes reactance, means to equalize the chararteristic impedance of said smooth line over a wide frequency range so that the resultant impedance is substantially a pure resistance, said means comprising a network connected in series with the line, said network including a component unit connected in series and comprising a resistance in parallel with an inductance.

6. In a smooth line whose characteristic impedance includes reactance, and which may be substantially simulated by a network consisting of a resistance in series with a parallel combination comprising a second resistance in parallel with a compound impedance unit including both resistance and reactance, means to equalize the characteristic impedance of said smooth line over a wide frequency range so that the resultant impedance is substantially a pure and constant resistance, said means comprising a network connected in series with said line, said network being electrically equivalent to a parallel combination of a resistance equal to said second resistance and a compound impedance unit which is the inverse with respect to said second resistance of said compound impedance unit of said first parallel combination.

7. In a smooth line whose characteristic impedance includes reactance, and which may be substantially simulated by a network consisting of a resistance in series with a parallel combination comprising a second resistance in parallel with a constituent network which is a definite function of the individual impedances of the component impedance elements, means to equalize the characteristic impedance of said smooth line over a wide frequency range so that the resultant impedance is substantially a pure and constant resistance, said means comprising a network connected in series with said line, said network being electrically equivalent to a parallel combination of a resistance equal to said second resistance and a second constituent network which comprises a plurality of component admittance elements so related that the admittance of said second constituent network will be the same function of the individual component admitttance elements as the function which relates the impedance of said first mentioned constituent network to the impedances of the individual elements thereof.

8. In a smooth line whose characteristic impedance includes reactance and which may be substantially simulated by a network consisting of a resistance of value $R_1$ in series with a parallel combination comprising a second resistance of value S in parallel with a compound impedance unit whose value may be expressed by the symbol J when J includes both resistance and reactance components, means to equalize the characteristic impedance of said smooth line over a wide frequency range so that the resultant impedance is substantially a pure and constant resistance, said means comprising a network connected in series with the line, said network being electrically equivalent to a parallel combination of a resistance of value S in parallel with a compound impedance unit whose value may be expressed by the symbol $\bar{J}$, when $\bar{J}$ is equal to $S^2/J$.

9. In a smooth line whose characteristic impedance includes reactance, means to equalize the characteristic impedance of said smooth line over a wide frequency range, so that the resultant impedance is substantially a pure and constant resistance, said means comprising a network connected in series with the line, said network comprising a plurality of component units connected in series, each component unit comprising a resistance in parallel with an inductance.

10. In a smooth line whose characteristic impedance includes reactance, means to equalize the characteristic impedance of said smooth line over a wide frequency range so that the resultant impedance is substantially a pure and constant resistance, said means comprising a network connected in series with the line, said network including a component unit connected in series and comprising a resistance in parallel with an inductance.

In testimony whereof, I have signed my name to this specification this 18th day of November, 1929.

RAY S. HOYT.